2,860,160
PREPARATION OF AMINOALKYL ACIDS AND DERIVATIVES THEREOF

Robert L. Sundberg, Plainfield, N. J., and Max E. Chiddix, Easton, and Earl P. Williams, Pen Argyl, Pa., assignors to General Aniline & Film Corporation, New York, N. Y., a corporation of Delaware No Drawing. Application November 19, 1956
Serial No. 622,735

17 Claims. (Cl. 260—501)

This invention relates to the preparation of aminoalkyl acids and derivatives thereof. More particularly, this invention relates to the preparation of new N-substituted aminoalkyl acids, such as the taurines or aminoaklyl sulfonic acids, and the aminoalkyl carboxylic acids.

We have found that valuable compounds having the general formula:

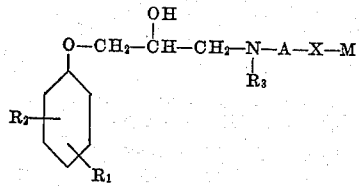

wherein $R_1$ stands for an alkyl radical having at least three carbon atoms, $R_2$ and $R_3$ represent hydrogen or a lower alkyl radical, and $R_1$ and $R_2$ must total at least 6 carbon atoms, A is an aliphatic group of from 1 to 6 carbon atoms such as methylene, ethylene, propylene, butylene, amylene and hexylene, X is the radical —$SO_3$ or —$CO_2$, and M is hydrogen or a salt-forming group selected from ammonia, aliphatic amines, alkali metals and alkaline earth metals. We prefer to prepare the foregoing compounds in accordance with the following reaction:

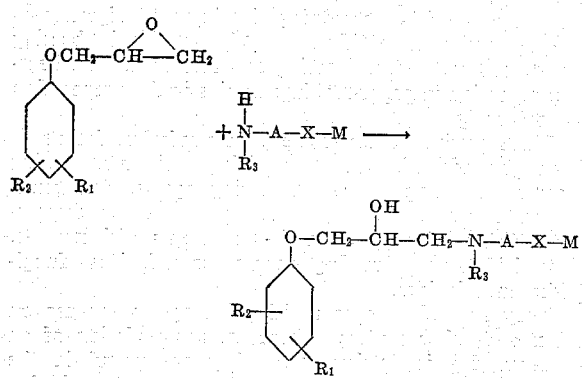

The epoxide compound reacts smoothly with N-substituted aminoalkyl compounds in aqueous form under mild reaction conditions. Addition of isopropanol to the aqueous media aids the reaction. Other water-miscible solvents for the epoxide may be used such as alcohols, e. g. methanol, ethanol and n-propanol, ketones, e. g. acetone, methyl ethyl ketone and diethyl ketone, are also suitable. The main function of the isopropanol appears to be solubilization of the epoxide into the aqueous reaction mixture. While the reaction temperature is not critical, good reaction was obtained at temperatures of 50 to 100° C., and particularly at temperatures of 75 to 85° C. The reaction was completed in less than four hours. Conveniently, the epoxide is added dropwise to the mixture of isopropanol and aqueous amino acid. This minimized certain side reactions such as hydrolysis of the epoxide and avoided sudden evolution of heat.

The epoxides which may be employed to produce the compounds of the instant invention are prepared by reaction of epichlorohydrin with an alkylated phenol in the presence of caustic according to the following equation:

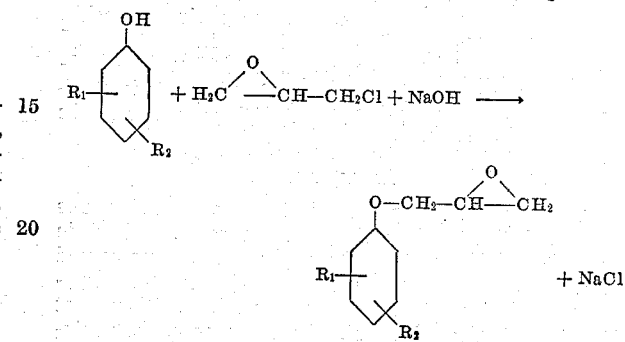

Examples of phenols which are suitable starting materials are: 2,4-dibutylphenol, p-(1,1,3,3-tetramethylbutyl) phenol, p-nonylphenol, 2,4-diamylphenol, dodecylphenol, dinonylphenol, 3-pentadecylphenol, heptylphenol, nonylcresol, butylcresol, octadecylphenol, di-dodecylphenol and dodecylcresol. Also, other monoalkyl and di-alkylphenols prepared from a phenol and propylene polymers (e. g. dipropylene, tripropylene and tetrapropylene) butylene polymers (e. g. dibutylene and tributylene) and propylene-butylene mixed polymers are also suitable phenols.

Examples of taurines which are suitable for reaction with the above epoxides are N-methyl taurine, N-ethyl taurine, N-isopropyl taurine, N-butyl taurine, N-hexyl taurine, 2-methyl taurine, N-methyl-2-methyl taurine, N-methyl-2-ethyl taurine, N-methyl-1,2-dimethyl taurine and derivatives thereof. Taurine derivatives which can be used in the process of our invention are in the form of their sodium, potassium, calcium, barium, magnesium, or tertiary amine salts. Suitable amines include trimethyl amine, triethyl amine and dimethyl ethanolamine. When ammonium, primary amine, and secondary amine salts are desired, they can be readily prepared from the inner salt by simple neutralization with the appropriate amine or ammonia. The inner salt is prepared by careful acidification of the initial product. Suitable primary and secondary amines include n-butylamine, n-dodecylamine, n-octadecylamine, diethylamine, dioctylamine, dilaurylamine, dioctadecylamine, ethylene diamine, ethanolamine, morpholine, methylamine, dimethylamine, ethylamine, amines prepared from oxoaldehydes, branched chain amines, diethylene triamine, 3-dimethylaminopropylamine and the like.

Examples of aminoalkylcarboxylic acids are glycine, $\alpha$ and $\beta$-alanine sarcosins, $\gamma$-aminobutyric acid, $\epsilon$-aminocaproic acid and the like. Esters of the foregoing carboxylic acids are also useful in the preparation of the compounds of this invention.

Our invention will now be illustrated, but not limited, by the following examples.

Example 1

Into a 2-liter round bottom flask equipped with stirrer, thermometer, condenser and addition funnel was placed 459 grams (1 equivalent based on secondary amino content) of aqueous methyl taurine solution and 400 milliliters of isopropanol. The contents of the flask were heated to 75° C. and a total of 276.4 grams (1.0 mole) of 3-(p-nonylphenoxy)-propylene oxide was added dropwise at a temperature of 74 to 82° C. over a period of 1⅓ hours. The reaction was then stirred for 2¾ hours at reflux (82 to 85° C.).

The solvents were distilled off at reduced pressure until excessive foaming occurred. The final product (flask residue) weighed 788.5 grams. The aqueous product gave excellent foam by the Ross-Miles method. The cotton detergency and wetting tests showed unusually high performance.

A 79 g. portion of the product was adjusted to pH 4 with 1 N hydrochloric acid converting it to the inner salt or zwitterion. It was then evaporated to dryness. The dry white waxy product was dissolved in 300 ml. of anhydrous ethanol to remove the sodium chloride. To the alcoholic solution was added 18.5 g. of lauryl amine to form the lauryl amine salt of N-methyl-N-(2-hydroxy-3-p-nonylphenoxy propyl)-taurine. This product was every effective in emulsifying vegetable oils or mineral oils in water.

*Example II*

Following the procedure of Example I, 19.8 grams (0.1 equivalent) of taurine, sodium salt dissolved in about 80 milliliters of 1:1 isopropanol-water was caused to react with 27.6 g. (0.1 mole) of 3-(p-nonylphenoxy)-propylene oxide. The mixture was stirred 5 hours at 83° C. Addition of 20 ml. of water gave a clear solution. The mixture was further heated for 5 hours and then allowed to cool to a gel.

*Example III*

Following the procedure of Example I, 50 grams (0.1 mole) of aqueous sarcosine, sodium salt and 40 milliliters of isopropanol were combined with 27.6 grams (0.1 mole) of 3-(p-nonylphenoxy)-propylene oxide. The mixture was heated at 70 to 80° C. for a total of 2½ hours. The resulting cloudy solution was diluted with 10 milliliters of isopropanol and 20 milliliters of distilled water. The reaction mixture became clear. The product was dried to a white powder (weight 43 grams) that dispersed well in water and gave good foam.

*Example IV*

Following the procedure of Example I, to 44.6 grams (0.5 mole) of β-alanine were added 147 milliliters of 3.5 N NaOH (0.514 equivalent), 125 milliliters of technical isopropanol and 50 milliliters of distilled water. The resulting mixture was heated to 80° C. and then 95.6 grams (0.345 mole) 3-(p-nonylphenoxy)-propylene oxide added dropwise. The addition was complete in 40 minutes. The reaction mixture was stirred 7 hours at reflux. The mixture was placed in a separatory funnel and the lower layer drawn off. The upper layer was washed and then dried. The product was found to inhibit rusting of steel.

As will be seen from the structural formula of the compounds of the instant invention, they are surface active agents which are ampholytic, i. e. that they can be useful as anionic surfactants, cationic surfactants or in the zwitterion form.

The products made by this process are valuable articles of commercial interest and have many varied uses. The possible applications of these new substances are extremely varied. The most conspicuous property of these new products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes and resins) into creamy emulsions, clear solutions or fine, stable dispersions; for carbonizing; for dyeing; for the pasting of dyestuffs, for fulling, sizing, impregnating and bleaching treatments; as cleansing agents in hard water; in tanning and mordanting processes; for dyeing cellulose acetate with insoluble dyestuffs; for the preparation of dyestuffs in finely divided form; for producing foam for fire extinguishers; as a means for improving the absorptive power of fibrous bodies; and as an aid in softening baths for hides and skins.

In addition, these products are valuable emulsifiers for insecticide compositions and agricultural sprays such as, for example, DDT (2,2-bis(p-chlorophenyl)-1,1,1-trichloroethane), 2,4-D (2,4 - dichlorophenoxy - acetic acid), toxaphene (chlorinated camphene (67–69% Cl)), chlordane (contains 60% of 1,2,4,5,6,7,8,8-octachloro-4,7 - methano - 3a,4,7,7a - tetrahydroindane), dormant or mineral oil sprays, nicotine sulfate (1-methyl-2-β-pyridyl-pyrrolidone sulfate), Dieldrin (contains 85% of 1,2,3,4, 10,10 - hexachloro - 6,7 - epoxy - 1,4,4a,5,6,7,8,8a - octahydro-1,4,5,8-dimethanonaphthalene), Aldrin (95% 1,2, 3,4,10,10 - hexachloro - 1,4,4a,5,8,8a - hexahydro - 1,4,5, 8-dimethanonaphthalene), Lindane (1,2,3,4,5,6-hexachlorocyclohexane, 99% gamma isomer), B. H. C. (mixed isomers of 1,2,3,4,5,6-hexachlorocyclohexane), Heptachlor (composition of unknown constitution made by Velsicol Corp.), I. P. C. (isopropyl N-phenyl carbamate), Chloro I. P. C. (isopropyl-N-(3-chlorophenyl) carbamate), Methoxychlor (1,1,1-trichloro-2,3-bis(p-methoxyphenyl)ethane, etc., and are effective dispersants for pesticidal powders, such as those containing the above toxicants.

These products are valuable for use as additives to petroleum products, as additives for fuel oils, lubricating oils, greases, as additives to the water or brine used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement; additives to asphalt compositions; plasticizers and modifiers for vinyl plastics, alkyd resins, phenol-formaldehyde resins, and other types of polymeric-type plastic materials; for incorporation into adhesives, paint, linoleum; for use in bonding agents used in various insulating and building materials; as refining aids in wood digesters to prepare pulp; as additives to pulp slurries in beating operations to prevent foaming and also to aid the beating operation in paper-making; as aids in the preparation of viscose dope.

These products are also useful as emulsifiers for emulsion polymerization, as mercerizing assistants, wetting agents, rewetting agents, dispersing agents, detergents, penetrating agents, softening agents, lime soaps, dispersants, dishwashing agents, anti-static agents, disinfectants, insecticides, mothproofing agents, bacteriocides, fungicides and biocides.

They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

These products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electro-plating baths.

Other valuable uses are as solvents or in solvent compositions, as cleaning agents for paint brushes, as additives for paints, lacquers, and varnishes; as lubricants, as greases and stuffing agents.

These products are valuable in the preparation of skin creams, lotions, salves and other cosmetic preparations such as home hair-wave sets, shampoos, toothpastes, etc. They may also be of value in food products as foaming agents, emulsifying agents, and softening agents.

They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; as curing aids and penetrants for use in fertilizer.

It is to be understood that the foregoing detailed description is merely given by way of illustration and that many variations may be made therein without departing from the spirit of our invention.

Having described our invention, what we desire to secure by Letters Patent is:

1. Process for the preparation of compounds having the general formula

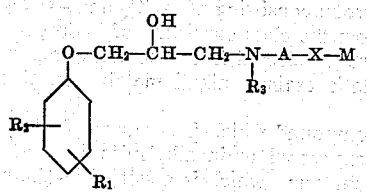

wherein $R_1$ represents an alkyl radical having at least three carbon atoms, $R_2$ and $R_3$ are selected from the class consisting of hydrogen and a lower alkyl radical, and $R_1$ and $R_2$ must total at least 6 carbon atoms, A is an aliphatic group of from 1 to 6 carbon atoms selected from the class consisting of methylene, ethylene, propylene, butylene, amylene and hexylene, X is a radical selected from the group consisting of $-SO_3$ and $-CO_2$, and M is selected from the class consisting of hydrogen and a salt-forming group selected from the class consisting of tertiary aliphatic amines, alkali metals and alkaline earth metals, which comprises reacting an alkylphenoxypropylene oxide with a compound of the formula

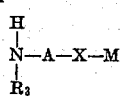

wherein $R_3$, A, X and M are as above.

2. Process for the preparation of compounds having the general formula

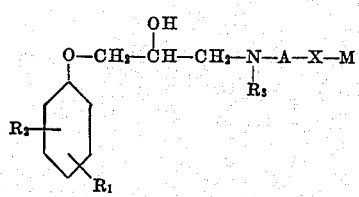

wherein $R_1$ stands for an alkyl radical having at least three carbon atoms, $R_2$ and $R_3$ represent a radical of the class consisting of hydrogen and a lower alkyl radical, and $R_1$ and $R_2$ must total at least 6 carbon atoms, A is an aliphatic group of from 1 to 6 carbon atoms selected from the class consisting of methylene, ethylene, propylene, butylene, amylene and hexylene, X is a radical selected from the class consisting of $-SO_3$ and $-CO_2$, and M is selected from the class consisting of hydrogen and a salt-forming group selected from the class consisting of tertiary aliphatic amines, alkali metals and alkaline earth metals, which comprises reacting an alkylphenoxypropylene oxide with an aqueous solution of a compound of the formula

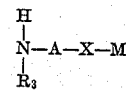

wherein $R_3$, A, X and M are as above.

3. Process for the preparation of compounds having the general formula

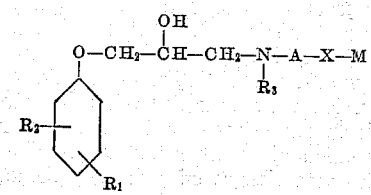

wherein $R_1$ stands for an alkyl radical having at least three carbon atoms, $R_2$ and $R_3$ represent a radical of the class consisting of hydrogen and a lower alkyl radical, and $R_1$ and $R_2$ must total at least 6 carbon atoms, A is an aliphatic group of from 1 to 6 carbon atoms selected from the class consisting of methylene, ethylene, propylene, butylene, amylene and hexylene, X is a radical selected from the class consisting of $-SO_3$ and $-CO_2$, and M is selected from the class consisting of hydrogen and a salt-forming group selected from the class consisting of tertiary aliphatic amines, alkali metals and alkaline earth metals, which comprises reacting an alkylphenoxypropylene oxide with an aqueous solution of a compound of the formula

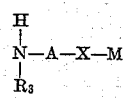

wherein $R_3$, A, X and M are as above, containing a water-miscible solvent for the alkylphenoxypropylene oxide.

4. Process for the preparation of compounds having the general formula

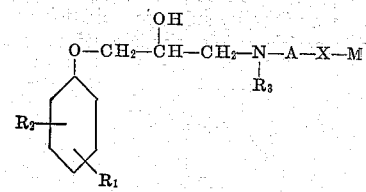

wherein $R_1$ stands for an alkyl radical having at least three carbon atoms, $R_2$ and $R_3$ represent a radical of the class consisting of hydrogen and a lower alkyl radical, and $R_1$ and $R_2$ must total at least 6 carbon atoms, A is an aliphatic group of from 1 to 6 carbon atoms selected from the class consisting of methylene, ethylene, propylene, butylene, amylene and hexylene, X is a radical selected from the class consisting of $-SO_3$ and $-CO_2$, and M is selected from the class consisting of hydrogen and a salt-forming group selected from the class consisting of tertiary aliphatic amines, alkali metals and alkaline earth metals, which comprises reacting an alkylphenoxypropylene oxide with an aqueous solution of a compound of the formula

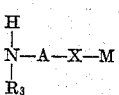

wherein $R_3$, A, X, and M are as above, containing a water-miscible solvent for the alkylphenoxypropylene oxide, selected from the group consisting of lower aliphatic alcohols and ketones.

5. Process for the preparation of compounds having the general formula

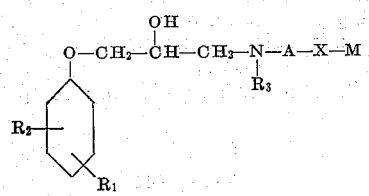

wherein $R_1$ stands for an alkyl radical having at least three carbon atoms, $R_2$ and $R_3$ represent a radical of the class consisting of hydrogen and a lower alkyl radical, and $R_1$ and $R_2$ must total at least 6 carbon atoms, A is an aliphatic group of from 1 to 6 carbon atoms selected from the class consisting of methylene, ethylene, propylene, butylene, amylene and hexylene, X is a radical selected from the class consisting of —$SO_3$ and —$CO_2$, and M is selected from the class consisting of hydrogen and a salt-forming group selected from the class consisting of tertiary aliphatic amines, alkali metals and alkaline earth metals, which comprises reacting an alkylphenoxypropylene oxide with an aqueous solution of a compound of the formula

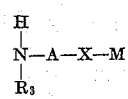

wherein $R_3$, A, X and M are as above, containing a water-miscible solvent for the alkylphenoxypropylene oxide, at a temperature of 50 to 100° C.

6. Process for the preparation of N-substituted aminoalkylsulfonic acid, which comprises reacting an aminoalkylsulfonic acid with an epoxide prepared by reacting epichlorhydrin with an alkyl phenol.

7. Process for the preparation of N-substituted aminoalkylcarboxylic acid, which comprises reacting an aminoalkylcarboxylic acid with an epoxide prepared by reacting epichlorhydrin with an alkyl phenol.

8. Process for the preparation of N-substituted aminoalkylsulfonic acid, which comprises reacting an aqueous solution of an aminoalkylsulfonic acid with an epoxide prepared by reacting epichlorhydrin with an alkyl phenol.

9. Process for the preparation of N-substituted aminoalkylsulfonic acid, which comprises reacting an aqueous solution of an aminoalkylsulfonic acid with an epoxide prepared by reacting epichlorhydrin with an alkyl phenol in the presence of a water-miscible solvent for the epoxide.

10. Process for the preparation of N-substituted aminoalkylsulfonic acid, which comprises reacting an aqueous solution of a taurine salt with 3-(p-nonylphenoxy)-propylene oxide in the presence of isopropanol.

11. Process for the preparation of N-substituted aminoalkylsulfonic acid, which comprises reacting an aqueous solution of methyl taurine with 3-(p-nonylphenoxy)-propylene oxide in the presence of isopropanol at a temperature of 50 to 100° C.

12. Process for the preparation of N-substituted aminoalkylsulfonic acid, which comprises reacting an aqueous solution of taurine, sodium salt with 3-(p-nonylphenoxy)-propylene oxide in the presence of isopropanol at a temperature of 50 to 100° C.

13. A compound of the general formula

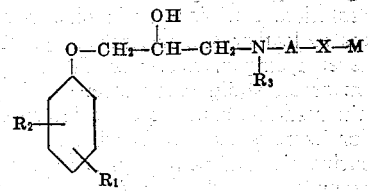

wherein $R_1$ represents an alkyl radical having at least three carbon atoms, $R_2$ and $R_3$ are selected from the class consisting of hydrogen and a lower alkyl radical, and $R_1$ and $R_2$ must total at least 6 carbon atoms, A is an aliphatic group of from 1 to 6 carbon atoms selected from the class consisting of methylene, ethylene, propylene, butylene, amylene and hexylene, X is a radical selected from the group consisting of —$SO_3$ and —$CO_2$, and M is selected from the class consisting of hydrogen and a salt-forming group selected from the class consisting of tertiary aliphatic amines, alkali metals and alkaline earth metals.

14. A compound which is a salt of N-(2-hydroxy-3-p-nonylphenoxypropyl)aminoalkylsulfonic acid.

15. A compound which is a salt of N-(2-hydroxy-3-p-nonylphenoxypropyl)aminoalkylcarboxylic acid.

16. A compound which is a salt of N-(2-hydroxy-3-p-nonylphenoxypropyl)taurine.

17. A compound which is the sodium salt of N-(2-hydroxy-3-p-nonylphenoxypropyl)taurine.

No references cited.